(12) United States Patent
Ottosson et al.

(10) Patent No.: US 12,269,143 B2
(45) Date of Patent: Apr. 8, 2025

(54) DRIVE ARRANGEMENT FOR A FLOOR SURFACING MACHINE AND A FLOOR SURFACING MACHINE

(71) Applicant: HUSQVARNA AB, Huskvarna (SE)

(72) Inventors: Linus Ottosson, Norsholm (SE); David Käcker, Söderköping (SE)

(73) Assignee: HUSQVARNA AB, Huskvarna (SE)

( * ) Notice: Subject to any disclaimer, the term of this patent is extended or adjusted under 35 U.S.C. 154(b) by 481 days.

(21) Appl. No.: 17/637,118

(22) PCT Filed: Jun. 4, 2020

(86) PCT No.: PCT/SE2020/050565
§ 371 (c)(1),
(2) Date: Feb. 22, 2022

(87) PCT Pub. No.: WO2021/034242
PCT Pub. Date: Feb. 25, 2021

(65) Prior Publication Data
US 2022/0339756 A1    Oct. 27, 2022

(30) Foreign Application Priority Data
Aug. 22, 2019   (SE) .................................... 1950959-5

(51) Int. Cl.
*B24B 47/12* (2006.01)
*B24B 7/18* (2006.01)
*B24B 27/00* (2006.01)

(52) U.S. Cl.
CPC ................ *B24B 47/12* (2013.01); *B24B 7/18* (2013.01); *B24B 27/0076* (2013.01)

(58) Field of Classification Search
CPC ............ B24B 7/12; B24B 7/18; B24B 7/0076
(Continued)

(56) References Cited

U.S. PATENT DOCUMENTS 2,301,164 A    11/1942  Mall
4,862,548 A *  9/1989  Sergio ................. A47L 11/4038
                                                      15/49.1
(Continued)

FOREIGN PATENT DOCUMENTS

CN    1033086 A    5/1989
CN    1309544 A    8/2001
(Continued)

OTHER PUBLICATIONS

Usarollerchain.com (https://web.archive.org/web/20170309222948/https://www.usarollerchain.com/Self-Lubricating-Roller-Chain-s/3355.htm) (Year: 2017).*
(Continued)

*Primary Examiner* — Eric J Rosen
*Assistant Examiner* — Robert C Moore
(74) *Attorney, Agent, or Firm* — Burr & Forman LLP

(57) ABSTRACT

A drive arrangement (300) for driving a planetary head (140) of a floor surfacing machine (100), the drive arrangement (300) comprising; a first drive wheel (310) arranged to be driven by a first motor (110), a second drive wheel (330) fixedly attached to the planetary head (140) and arranged to be driven by the first drive wheel via a connecting member (320), wherein the drive arrangement (300) comprises a protective casing (240) arranged to enclose the first (310) and second (330) drive wheels, and the connecting member (320), thereby protecting the drive arrangement (300) from dust, debris, and slurry.

21 Claims, 8 Drawing Sheets

(58) Field of Classification Search
USPC .......................................................... 451/350
See application file for complete search history.

(56) References Cited

U.S. PATENT DOCUMENTS

| | | | |
|---|---|---|---|
| 6,540,596 B1 | 4/2003 | Van Der Veen | |
| 7,247,085 B1 | 7/2007 | Anderson | |
| 7,377,838 B1 | 5/2008 | Van Vilet | |
| 8,028,977 B2* | 10/2011 | Blaser ................... | B23K 26/704 |
| | | | 451/36 |
| 2004/0023608 A1 | 2/2004 | Van Vliet et al. | |
| 2004/0077300 A1* | 4/2004 | Thysell ................... | B24B 7/186 |
| | | | 451/350 |
| 2006/0076821 A1 | 4/2006 | Troudt et al. | |
| 2010/0015896 A1* | 1/2010 | Bergstrand ............ | B24B 41/047 |
| | | | 451/259 |
| 2017/0238779 A1* | 8/2017 | Berg ....................... | B24B 7/186 |
| 2020/0346315 A1* | 11/2020 | Persson .................... | B28D 1/00 |

FOREIGN PATENT DOCUMENTS

| | | |
|---|---|---|
| CN | 1489506 A | 4/2004 |
| CN | 203650160 U | 6/2014 |
| CN | 205342708 U | 6/2016 |
| CN | 205552164 U | 9/2016 |
| EP | 0314926 A2 | 5/1989 |
| EP | 1941823 A2 | 7/2008 |
| EP | 2508301 A1 | 10/2012 |
| EP | 2659825 A1 | 11/2013 |
| GB | 819231 A | 9/1959 |
| GB | 822228 A | 10/1959 |
| NL | 1014015 C2 | 7/2001 |
| WO | 03076131 A1 | 9/2003 |
| WO | 2008069748 A1 | 6/2008 |
| WO | 2016048213 A1 | 3/2016 |
| WO | 2018074965 A1 | 4/2018 |
| WO | 2019143278 A1 | 7/2019 |

OTHER PUBLICATIONS

International Search Report and Written Opinion for International Application No. PCT/SE2020/050565 mailed Aug. 12, 2020.
Search Report and Office Action for Swedish Application No. 1950959-5 mailed Feb. 20, 2020.
Search Report and Office Action for Swedish Application No. 1950960-3 mailed Feb. 20, 2020.
Search Report and Office Action for Swedish Application No. 1950961-1 mailed Feb. 20, 2020.

* cited by examiner

DRIVE ARRANGEMENT FOR A FLOOR SURFACING MACHINE AND A FLOOR SURFACING MACHINE

TECHNICAL FIELD

There are disclosed herein drive arrangements for driving a planetary head of a floor surfacing or grinding machine. The floor surfacing machines described herein are suitable for grinding and polishing hard floor surfaces such as concrete floor surfaces.

BACKGROUND

A floor surfacing or grinding machine is commonly used to strip or smooth flooring by grinding away undesired material. Floor surfacing machines provide clean, smooth and essentially flat surfaces to which new coverings or coatings can be applied. Floor surfacing machines are also commonly used to smooth rough flooring surfaces or to remove surface levelling compounds to create a floor which has a smooth, level surface. Certain surfaces, including some types of concrete, are also suitable for polishing using a floor surfacing machine. One common type of a floor surfacing machine is the planetary-type machine. This type of machine normally comprises two to four, or even more, satellite grinding heads mounted within a larger planetary head, where the satellite grinding heads may be driven in one direction and the planetary head in another direction. A motor, normally an electrical motor, drives both the satellite grinding heads and the planetary head, where transmission is accomplished by means of transmission belts and belt pulleys.

Some floor grinding machines comprise a first motor arranged to drive the planetary head, and a second motor arranged to drive the satellite grinding heads.

U.S. Pat. No. 6,540,596 B1 and WO 2008/069748 A1 both disclose surfacing machines with two drive motors.

EP 1 941 823 A2 discloses a surfacing machine with one motor to drive the planetary head and a plurality of separate motors arranged to drive the satellite grinding heads.

A challenge when using more than one drive motor is that more than one drive arrangement is required. These drive arrangements may need regular maintenance in order to remove build-up of dust, debris, and slurry generated during floor surfacing. If not properly maintained, the build-up of particles may immobilize the drive arrangement and cause equipment failure.

There is a need for reduced maintenance floor surfacing machines comprising two or more drive motors.

SUMMARY

It is an object of the present disclosure to provide improved drive arrangements for driving a planetary head of a floor surfacing machine. The disclosed drive arrangements comprise a first drive wheel arranged to be driven by a first motor and a second drive wheel fixedly attached to the planetary head and arranged to be driven by the first drive wheel via a connecting member. The drive arrangements also comprise a protective casing arranged to enclose the first and second drive wheels, and the connecting member, thereby protecting the drive arrangement from dust, debris, and slurry.

The floor surfacing machine may be a floor grinding machine, or e.g. a floor cleaning machine.

The disclosed drive arrangements allow for reduced servicing of the floor surfacing machine, which is an advantage. The life-time of the floor surfacing machine may also be prolonged.

According to aspects, the first and second drive wheels are sprockets configured to engage a drive chain constituting the connecting member. A drive chain is able to withstand high torque, which is an advantage. A double chain provides an even more robust connecting member.

According to some aspects, the protective casing is configured to hold an amount of lubricating agent, e.g., oil, for lubricating the drive chain. This way smooth operation is provided. The lubricating agent is not contaminated by outside particles due to the protective casing, which may also be configured as a sealed casing.

According to some aspects, the drive chain is a self-lubricating chain. A self-lubricating drive chain reduces maintenance and servicing needs of the drive arrangements, which is an advantage.

According to aspects, the first and second drive wheels are belt pulleys configured to engage a drive belt constituting the connecting member. The belt pulley and overall belt configuration may be more cost efficient compared to a chain drive.

According to other aspects, the connecting member comprises a gear train or gear transmission arranged to transfer power from the first motor to the second drive wheel for powering the planetary head. This gear arrangement provides a robust power transfer between the first motor and planetary head. The gear arrangement may be comprised in an all-metal power transfer between the first motor and planetary head.

The geared connection between the first drive wheel and the second drive wheel constituting the connecting member may be a direct gear connection or an indirect gear connection.

According to aspects, the protective casing comprises a sheet material enclosure arranged to be sealed against a rotating part of the floor surfacing machine by a radial seal. The radial seal provides a reliable seal which prevents dust penetration, while at the same time being cost efficient and easy to assemble.

According to aspects, the protective casing comprises a sheet material enclosure arranged to be sealed against a motor mounting plate to which the first motor is attached. The sheet material may be, e.g., sheet metal or plastics, which are materials that can be easily formed into a durable casing with suitable shape.

According to aspects, the protective casing is arranged to be attached to the motor mounting plate by at least one sealing screw. The use of sealing screws provides further protection against dust penetration, thereby providing an improved sealing function.

According to aspects, a seal between the protective casing and the motor mounting plate comprises a foam seal arranged circumferentially along a rim of the protective casing. The foam seal guards against dust penetration via the rim of the protective casing in a robust and reliable and cost efficient manner.

According to aspects, a diameter of the second drive wheel is larger than a diameter of the first drive wheel. This way a suitable power ratio may be provided between motor and tool, which allows for use of a less powerful motor, and gives more freedom to design the overall drive system.

According to aspects, the drive arrangement is arranged to drive at least one satellite grinding head by a second drive motor.

According to some such aspects, the at least one satellite grinding head is fixedly attached to a respective belt pulley. The belt pulley is arranged to be driven by a belt or other connecting member from a central pulley attached to a motor axle of the second drive motor. The second drive wheel may be journaled about the motor axle of the second drive motor.

According to aspects, the second drive wheel is arranged radially inwards from a motor axle of the first drive motor on the planetary head.

There are also disclosed herein floor surfacing machines comprising the drive arrangements discussed above and in the detailed description.

There are furthermore disclosed herein wheel support assemblies for attaching drive wheels to a floor surfacing machine. In particular, there is disclosed herein a wheel support assembly for a floor surfacing machine. The wheel support assembly comprises an integrally formed support member configured with a weight to weigh down an attachable wheel against a ground plane. The support member has a weight in the range of 15-60 kg, preferably 20-40 kg, and more preferably 23-30 kg, and even more preferably 24-27 kg.

The support member configuration spares the drive wheel axle from supporting the full weight of the floor surfacing machine, which weight is now instead mostly handled via the supporting member. The support member may, e.g., be integrally formed in cast iron or molded steel.

According to aspects, the wheel support assembly is arranged displaceable along a lateral displacement direction L with respect to a longitudinal direction P of the attachable wheel. The support member is arranged to be fixed at two or more different lateral displacements. This way the wheel support assembly may accommodate planetary heads of different diameters, providing for a versatile wheel support assembly.

According to aspects, the wheel support assembly comprises an integrated drive arrangement arranged to drive the attached wheel by a drive unit via a connecting member. An axle of the drive unit may be parallelly displaced from an axle of the attachable wheel. By moving the drive unit away from the wheel axle, the drive unit can be positioned further from the ground plane where it is more protected.

According to aspects, the drive unit is arranged at an angle from an axle of the attachable wheel with respect to a ground plane normal. Thus, if the wheel support assembly is a left wheel support assembly, the angle can be made different compared to the angle for a right wheel support assembly. This way the drive units become displaced in relation to each other, which allows them to coexist in a small volume.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described more in detail with reference to the appended drawings, where.

DETAILED DESCRIPTION

Figure 1A:
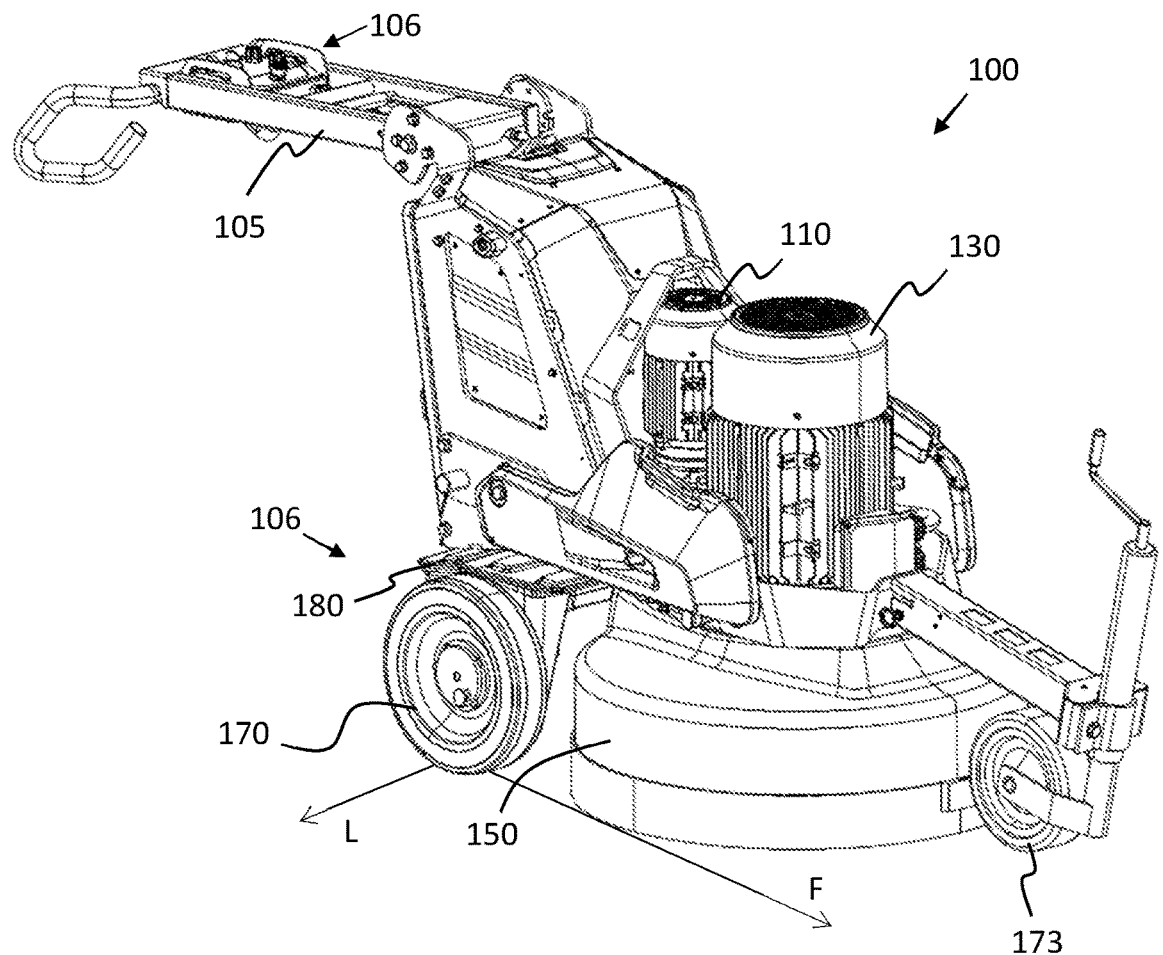
FIGS. 1A-D illustrate views of an example floor surfacing machine.
Figure 1B:
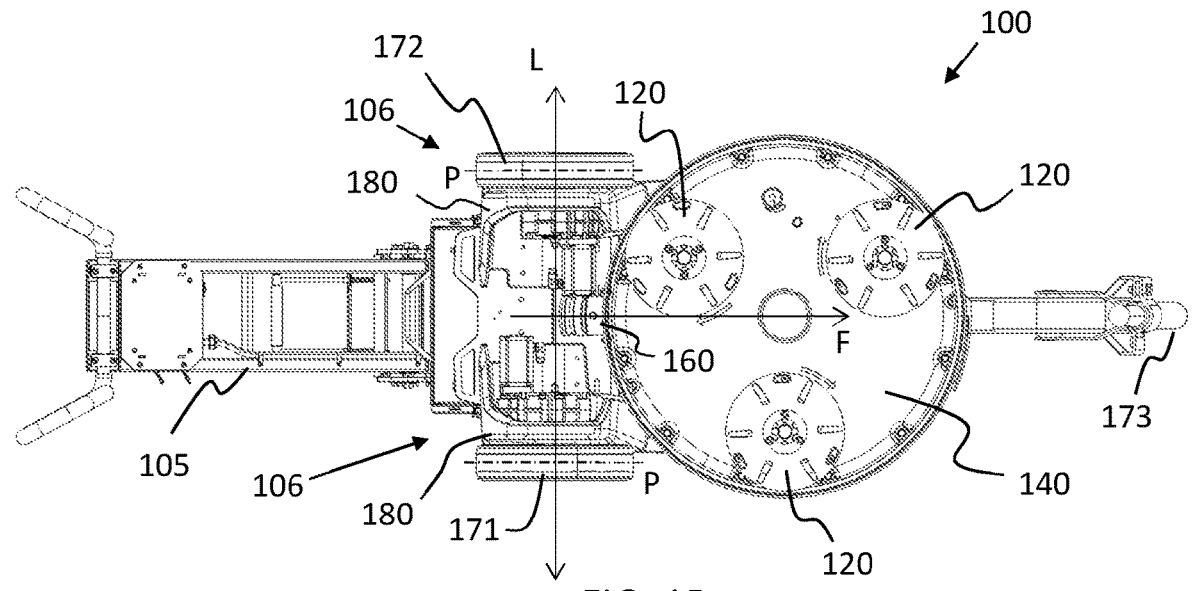
Figure 1C:
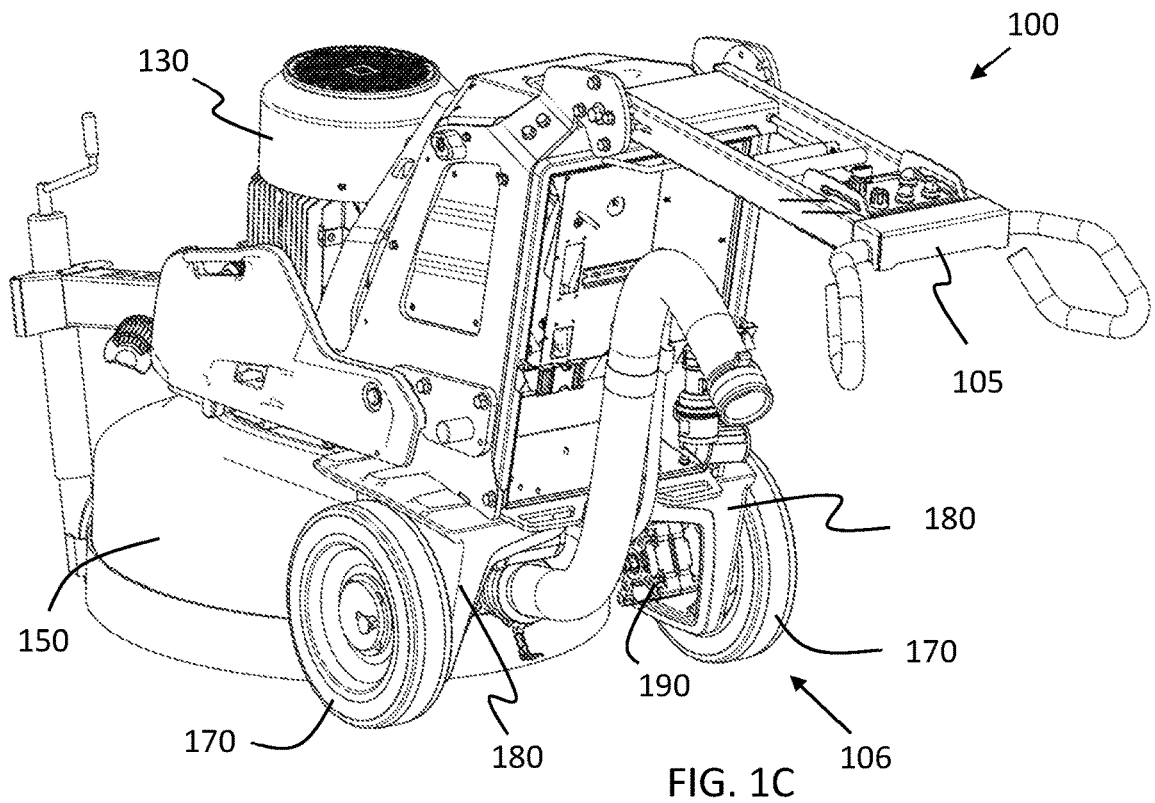
Figure 1D:
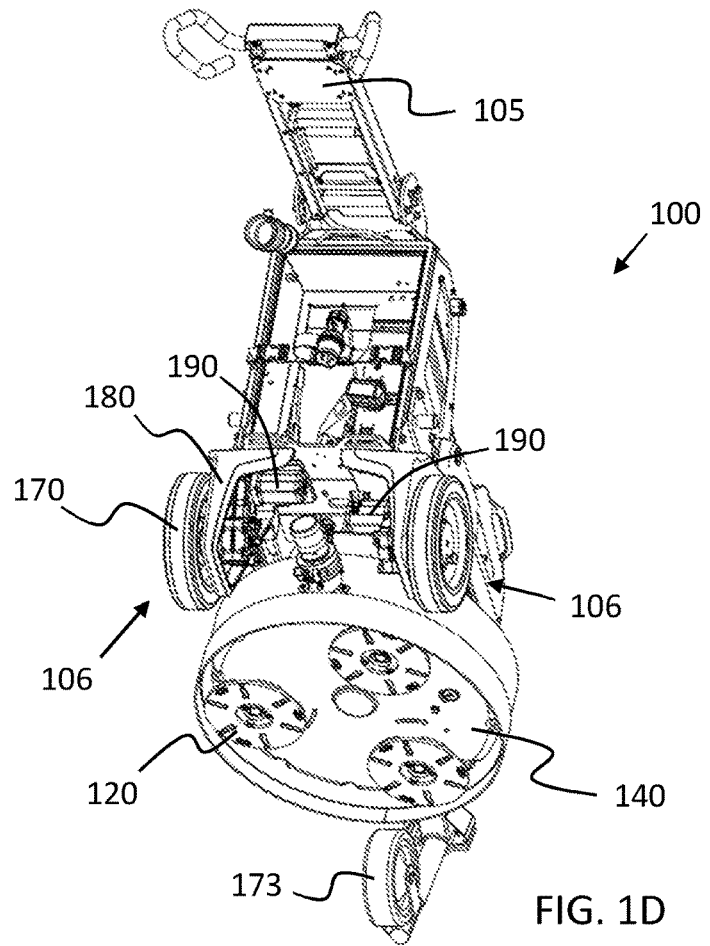

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

FIGS. 1A-1D illustrate views of a floor surfacing machine, such as a floor grinding machine, comprising two drive motors 110, 130. A first drive motor 110 is arranged to drive a planetary head 140. A second drive motor 130 is arranged to drive a plurality of satellite grinding heads 120. A cover 150 protects the planetary head 140 and the satellite grinding heads 120 and allows for dust and debris to be sucked up via an outlet opening 160.

A forward direction F of the machine 100 is defined as extending away from the handle part 105 which comprises user controls 106 for operating the machine. The forward direction F can also be said to be away from the drive wheels 170 of the floor surfacing machine 100. A lateral direction extends orthogonal to the forward direction, i.e., orthogonal to an extension plane P of the drive wheels 170, shown in FIG. 1B.

The left 171 and right 172 drive wheels of the machine 100 are attached via respective wheel support assemblies 106. Each wheel support assembly comprises an integrally formed support member 180 configured with a weight to weigh down its wheel 170 against the ground, thereby providing traction to power the machine 100 in the forward direction during floor surfacing. To provide enough traction, the support member 180 has a weight in the range of 15-60 kg, preferably 20-40 kg, and more preferably 23-30 kg, and even more preferably 24-27 kg. In an embodiment the weight is about 26 kg.

The floor surfacing machine 100 also comprises a support wheel 173 arranged in front of the drive wheels 170.

Each wheel support assembly 106 also comprises an integrated drive arrangement 190 configured to propel the drive wheels 170. The drive arrangement 190 may, e.g., be based on electric motors connected to respective drive wheels 170.

The floor surfacing machine 100 may be operated by controls on the machine, or remotely via remote control. The remote control may be arranged to generate a warning signal in response to an overload condition at a drive motor, as will be further discussed below.

The wheel support assemblies 106, i.e., the wheel support assembly for the left 171 and the right 172 drive wheel, will be discussed in more detail below in connection to FIGS. 7-10.

Figure 2A:
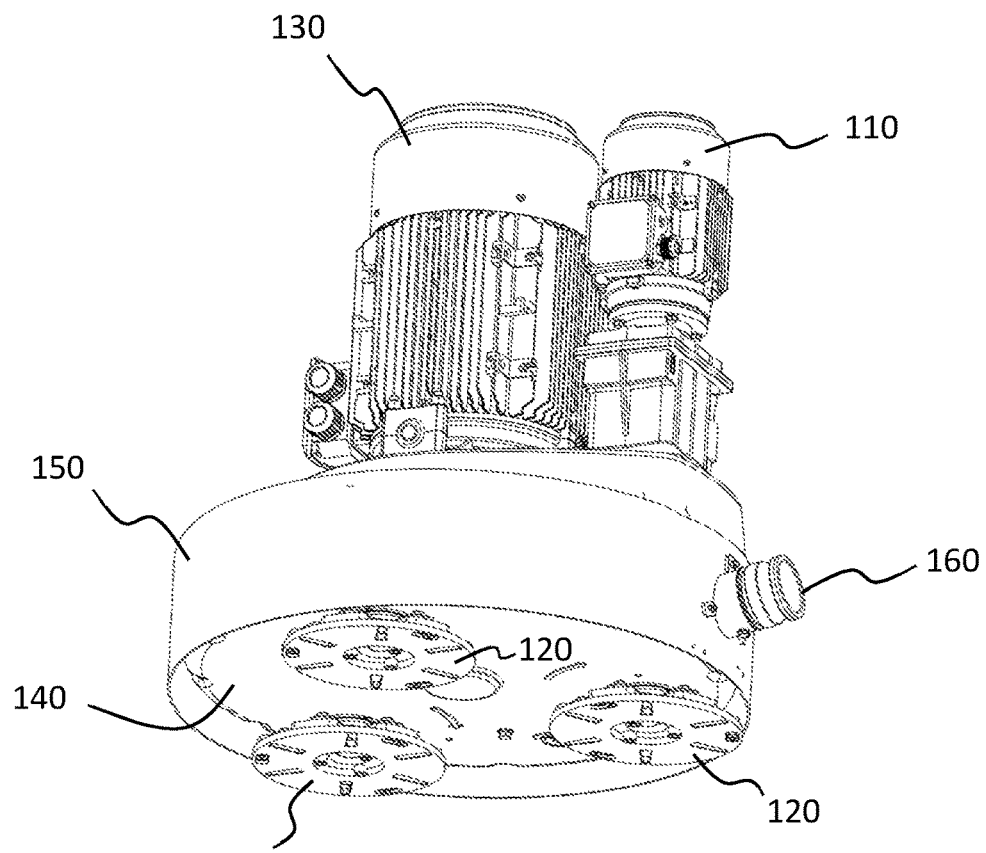
FIGS. 2-3 show details of example floor surfacing machines.
Figure 2B:
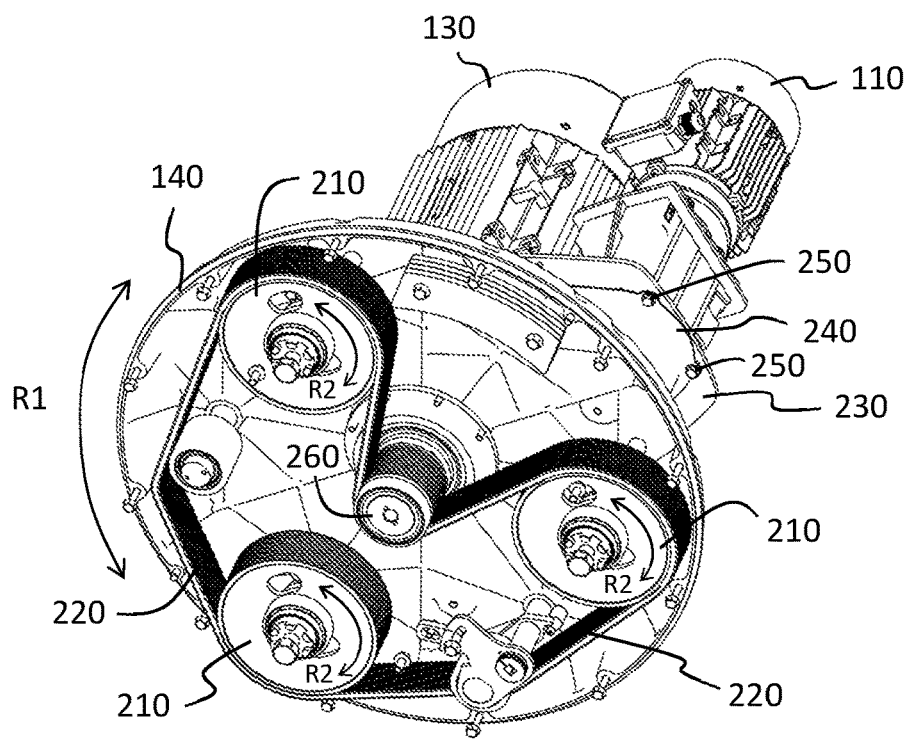

FIGS. 2A and 2B illustrate details of the drive arrangement for driving the satellite grinding heads 120. Each satellite grinding head 120 is fixedly attached to a belt pulley 210, which is driven by a belt 220 from a central pulley 260 driven by a motor axle 135 of the second drive motor 130. The floor surfacing machine 100 normally comprises three satellite grinding heads 120, but any number of grinding heads can be provided.

The planetary head 140 is rotated about the motor axle 135 of the second drive motor 130 by the first drive motor 110. The direction of rotation R1 of the planetary head 140 and the direction of rotation R2 of the satellite grinding heads are controlled independently from each other, which is an advantage.

Floor surfacing machines such as the floor surfacing machine 100 with independently operable first and second drive motors were described in U.S. Pat. No. 6,540,596 B1, and also in SE 539 542 C2, and will therefore not be discussed in more detail herein.

However, the drive arrangements for driving the planetary heads 140 in the type of dual drive arrangements disclosed in U.S. Pat. No. 6,540,596 B1, and also in SE 539 542 C2 requires maintenance in order to prevent build-up of particles, such as dust, debris, and slurry generated during floor surfacing.

The drive arrangement for driving the planetary head shown, e.g., in FIG. 2B is maintenance free or at least almost maintenance free. This is enabled by way of a protective casing 240 or even a sealed casing arranged to enclose parts of the drive arrangement for driving the planetary head, thereby protecting the drive arrangement from dust, debris, and slurry. The protective casing 240 is sealed at its top side against a motor mounting plate 230 to which the first motor 110 is attached. The protective casing is also sealed against the floor surfacing machine rotating part 420 by a radial seal which will be discussed in connection to FIGS. 3 and 4 below.

According to some aspects the protective casing is a sealed casing with no conduit to an exterior of the casing. However, the casing does not have to be entirely sealed. For instance, one or more small air-holes may be drilled in the upper part of the casing. However, the protective casing is preferably able to withstand, e.g., high power pressure washing and the like without water penetrating into the interior of the protective casing.

With reference to FIG. 1A, the first drive motor 110 is arranged to the rear of the floor surfacing machine 100, i.e., between the second drive motor 130 arranged to drive the plurality of satellite grinding heads 120 and the handle part 105 comprising the user controls for operating the machine. This location is out of the way and offers some protection for the first drive motor, which is an advantage. The protective casing 240 extends from the second drive motor to the rear of the floor surfacing machine 100. The protective casing 240 protects both axles of the first and the second drive motor.

Figure 3:
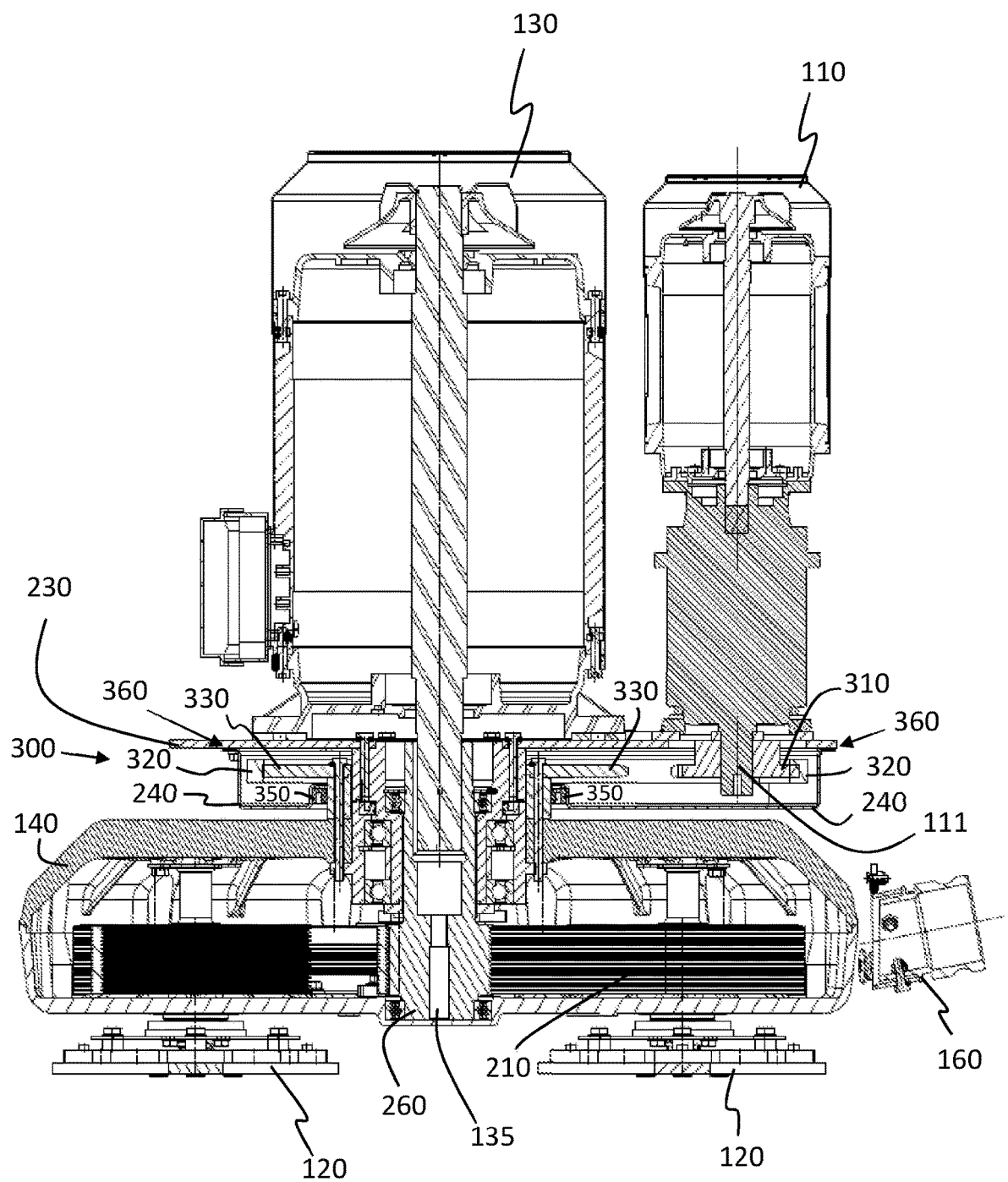

FIG. 3 shows a cross-sectional view of an example floor surfacing machine drive part comprising the protective casing 240. In particular, there is illustrated an example drive arrangement 300 for driving a planetary head 140 of a floor surfacing machine 100. The drive arrangement 300 comprises a first drive wheel 310 arranged to be driven by the first motor 110. A second drive wheel 330 is fixedly attached to the planetary head 140 and arranged to be driven by the first drive wheel via a connecting member 320, such as a chain or a belt. Note that the second drive wheel 330 is arranged radially inwards from a motor axle 111 of the first drive motor 110 on the planetary head 140.

Figure 4:
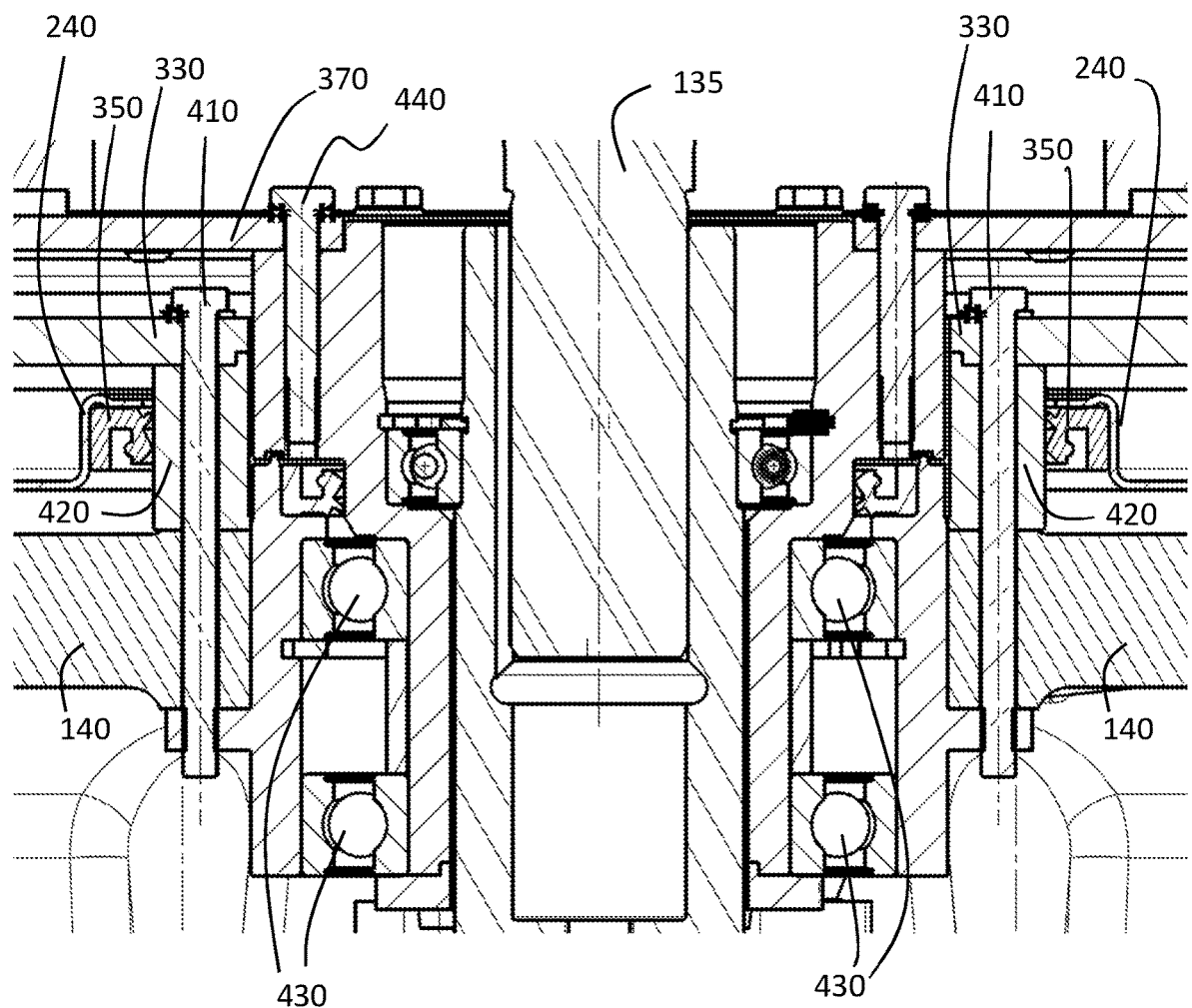
FIG. 4 shows details of an example drive arrangement.

FIG. 4 is a close-up view of the motor axle 135 of the second drive motor 130. Note that the second drive wheel 330 is journaled about the motor axle 135 of the second drive motor 130 and bolted 410 to the planetary head, i.e., fixedly attached to the planetary head 140. The second drive wheel 330 may of course be fixedly attached to the planetary head 140 in other ways, e.g., by welding. Also, as noted below, the second drive wheel may form part of a direct or indirect gear transmission, or part of a belt drive arrangement, just to name a few examples.

The rotatable planetary head 140 assembly bears against the non-rotating parts of the floor surfacing machine 100, e.g., by ball-bearings 430. Note also how the protective casing 240 here comprises a sheet material enclosure arranged to be sealed against a rotating part 420 of the floor surfacing machine 100 by a radial seal 350 arranged around a motor axle 135 of a second drive motor 130 arranged to drive at least one satellite grinding head 120. The rotating part 420 comprises the planetary head 140 and the satellite grinding heads 120. The protective casing 240 on the other hand is part of a stationary part 440 of the floor surfacing machine, i.e., a part that does not rotate along with the planetary head 140 during operation. The stationary part 440 also comprises, e.g., the drive motors 110, 130, the mounting plate 230, and the handle part 105. The rotating part 420 bears against the stationary part 440. The rotating part 420 rotates relative to the stationary part. The rotating part 420 comprises the satellite grinding heads 120 which bear against the rotating part.

Figure 5:
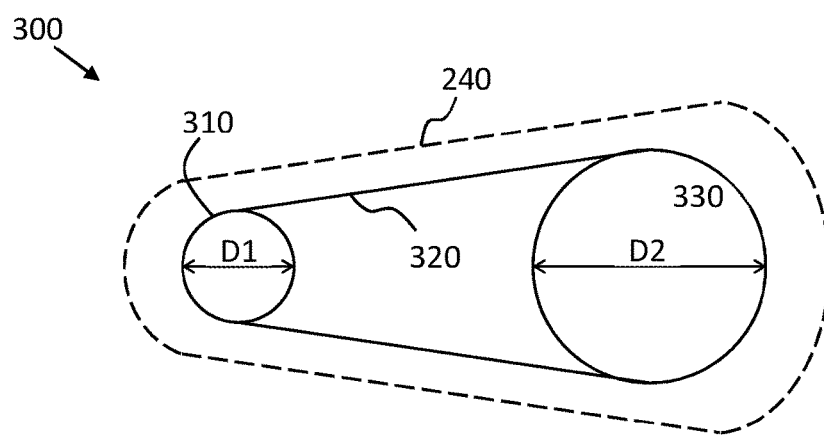
FIGS. 5-6 schematically illustrate an example drive arrangements.

FIG. 5 shows a schematic top view of a drive arrangement 300. The first drive wheel 310 may be about 100 mm in diameter, while the second drive wheel 330 may be about 300 mm in diameter. Thus, the diameter D1 of the first drive wheel 310 is smaller than the diameter D2 of the second drive wheel 330. This way a power ratio is provided by the drive arrangement.

In case a drive chain is used, the first 310 and second 330 drive wheels are sprockets configured to engage the drive chain to bring the planetary head into the rotation R1.

According to some aspects, the drive chain is a self-lubricating chain. This further reduces the maintenance need of the drive arrangement, since the self-lubricating drive chain can be designed to last the entire excepted lifetime of the floor surfacing machine 100.

In case a normal chain is used, the protective casing 240 can be designed to hold an amount of lubricating agent, e.g., lubricating oil.

According to some aspects, the drive chain is a double chain. A double chain may be required in order to withstand the requirements on torque imposed on the drive arrangements. A double chain may prolong lifetime of the floor surfacing machine.

In case a drive belt is used, the first 310 and second 330 drive wheels are belt pulleys configured to engage the drive belt to bring the planetary head into the rotation R1.

Figure 6A:
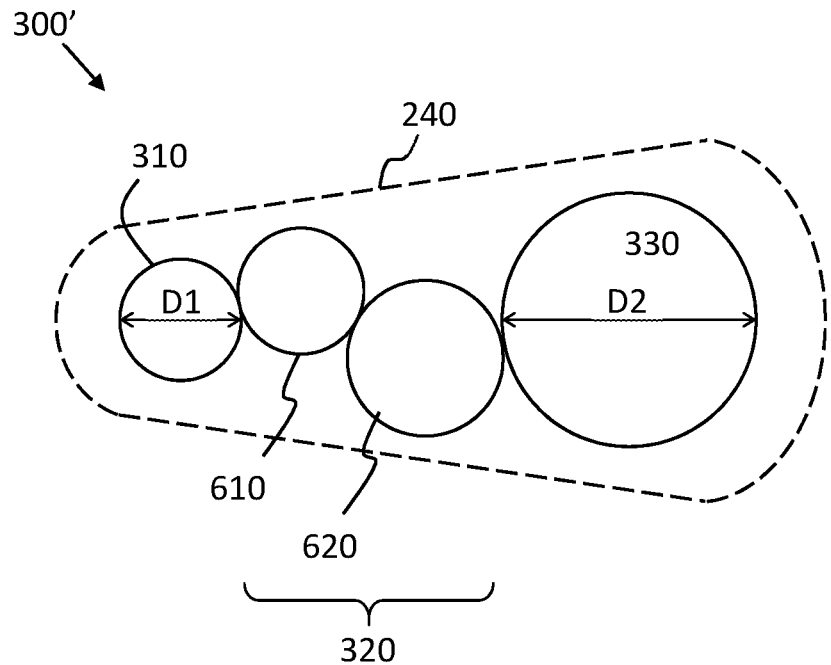
Figure 6B:
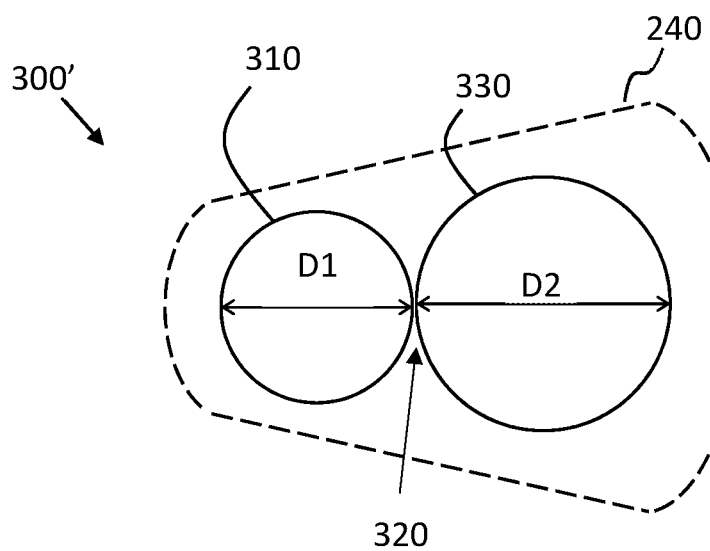

FIGS. 6A and 6B show schematic top views of aspects of another drive arrangement 300'. Here the connecting member 320 is a geared connection, i.e., a direct gear connection between the first 310 and second 330 drive wheels or a gear train comprising one or more gears 610, 620. The geared connection may be part of a gear transmission arrangement. The geared connecting member also provides a power ratio.

In other words, according to some aspects, the connecting member 320 comprises a gear train 610, 620 arranged to transfer power from the first motor 110 to the second drive wheel 330. The gear train may be part of a gear transmission system, i.e., can be configured with a given gear ratio.

To summarize, the floor surfacing machine 100 optionally comprises a first geared drive wheel 310 arranged to be driven by the first drive motor 110 and a second geared drive wheel 330 fixedly attached to the planetary head 140. The first drive wheel directly or indirectly engages with the second drive wheel to form the connecting member 320.

In case the protective casing 240 is arranged to hold an amount of lubricating agent, e.g., lubricating oil, the geared connection may be lubricated by the agent, thus providing extended service interval, since the lubricating agent is protected from outside contamination.

The drive arrangements 300, 300' also comprise the protective casing 240 which is arranged to enclose the first drive wheel and the second drive wheel 330, and also the connecting member 320, thereby protecting the drive arrangement 300 from dust, debris, and slurry. According to some aspects the protective casing is a sealed casing without access from the outside. Since the drive arrangement is protected from the outside, there will be no build-up of particles inside the drive arrangement, and corrosion will be reduced, which is an advantage.

According to some aspects, the protective casing 240 comprises a sheet material enclosure arranged to be sealed against a rotating part of the floor surfacing machine 100 by a radial seal 350. The sheet material may be, e.g., sheet metal which is both durable and provides a cost effective seal against outside debris.

The protective casing 240 may comprise a sheet material enclosure arranged to be sealed against a motor mounting plate 230 to which the first motor 110 is attached.

Also, the protective casing 240 may be attached to the motor mounting plate 230 by at least one sealing screw 250, thereby providing an improved seal with extended lifetime.

According to some aspects, a seal between the protective casing 240 and the motor mounting plate 230 comprises a foam seal 360 arranged circumferentially along a rim of the protective casing 240.

FIG. 4 shows details of the drive arrangement, i.e., is a zoomed in view of details in FIG. 3. In particular, the radial seal 350 is illustrated. Also, bolts 410 used to attach the second drive wheel to the planetary head are shown in detail.

The disclosed drive arrangements provide reduced problems with dust intrusion, misalignment of sprocket to welded chain ring and adjustment/mounting difficulties. The new drive arrangements disclosed herein may comprise machined components with good control over alignment, and a protective casing (using a radial seal and gasket) which eliminates dust intrusion.

Also, the new design provides for a simplified tensioning and mounting of a drive chain.

The first motor may be configured for generating a power in the range 2-2.5 kW, at about 1400 rpm, based on an inverter controlled 3-phase motor. The first motor may be attached to a gearbox providing a gear ratio of between 1:10 and 1:25, depending on the transmission ratio in the drive arrangement.

The transmission ratio between the first drive wheel 310 and the second drive wheel 330 may be in the range 3:1 to 5:1, where the first drive wheel is the smaller wheel of the two.

According to an example, the first motor 110 may be a 2.2 kW, 1430 rpm motor providing 14.5 Nm at 50 Hz. The gearbox ratio from the first motor drive shaft to the planetary head may be about 1:74.

The second motor 130 may be configured for generating a power in the range 10-20 kW, and preferably about 11 kW or 15 kW. According to an example, the second motor 130 may be an 11 kW or 15 kW motor.

A center to center distance between drive shafts of the first and second motor may be about 275 mm, in order to fit both motors and a gearbox of the first motor.

According to aspects the drive arrangement 300, 300' includes the first drive wheel 310 arranged to be driven by the first drive motor 110, and the second drive wheel 330 fixedly attached to the planetary head 140 and arranged to be driven by the first drive wheel 310. The second drive wheel 330 is arranged radially inwards from the first motor axle 111 of the first drive motor 110 relative to a rotational axis of a second motor axle 135 of the second drive motor 130. And, the second drive wheel 330 is provided with a central aperture encircling the second motor axle 135, and the second drive wheel 330 is arranged coaxial with the second motor axle 135 and arranged rotatable relative to the second motor axle 135. The central aperture preferably has a circular shape, but may take other forms.

According to further aspects, the rotational axes for the first drive wheel 310 and the second drive wheel 330 are parallel and the first drive wheel 310 and the second drive wheel 330 are arranged in a common plane, wherein said plane is arranged perpendicular to said rotational axes.

Preferably, the drive arrangement 300, 300' includes the connecting member 320, such that the second drive wheel 330 is driven by the first drive wheel 330 via said connecting member 320. However, it is conceivable to have the first drive wheel 330 directly engaging the second drive wheel 330, i.e such that the drive arrangement does not include the connecting member 320.

Preferably, the diameter of the central aperture of the second drive wheel 330 is greater than a shortest distance between the aperture and the periphery of the second drive wheel 330 along a radius of the second drive wheel 330.

According to aspects, the second drive wheel 330 is attached to the planetary head by fastening means 410. The fastening means 410 engages the second drive wheel 330 at a position between the periphery of the central aperture and the periphery of the second drive wheel 330, and preferably at a position in the vicinity of the periphery of the central aperture. The fastening means are typically in the form of one or several bolts, screws or welds. The fastening means may be a combination of different fastening means, such as both screws and welds.

Preferably, the drive arrangement 300, 300' is sealingly encapsulated and thereby separated from the drive arrangement for driving the satellite heads 120.

FIGS. 7-10 illustrate details of a wheel support assembly 106 for a floor surfacing machine 100. The wheel support assembly 106 comprises an integrally formed support member 180 configured with a weight sufficient to weigh down an attachable wheel, i.e., a drive wheel 170 of the floor surfacing machine, against a ground plane 730. The support member 180 has a weight in the range of 15-60 kg, and preferably 20-40 kg, more preferably 23-30 kg, and even more preferably 24-27 kg, such as about 26 kg.

By integrating the weight into the support member 180, the drive wheels 170 of the floor surfacing machine 100 are weighted down to provide traction. The weight comprised in the support member is well positioned to provide traction.

Weights arranged more distant from the wheel would not be as effective in providing increased traction. The support member 180 may, for example, be integrally formed in cast iron or molded steel.

Figure 8:
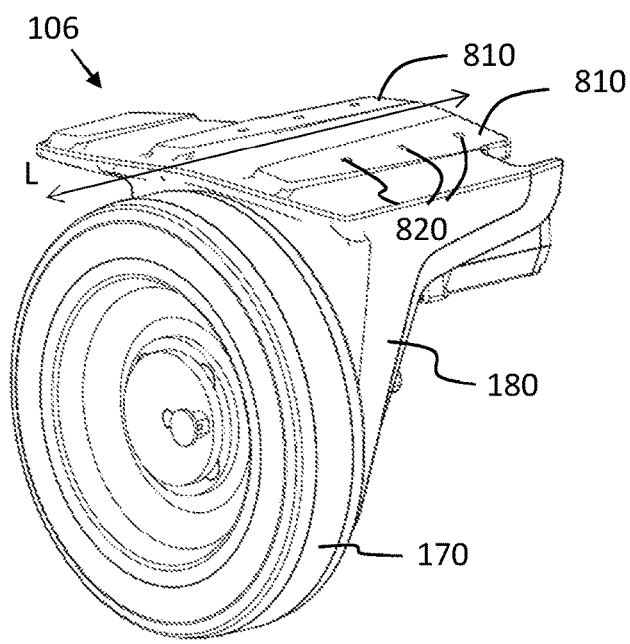
Figure 9:
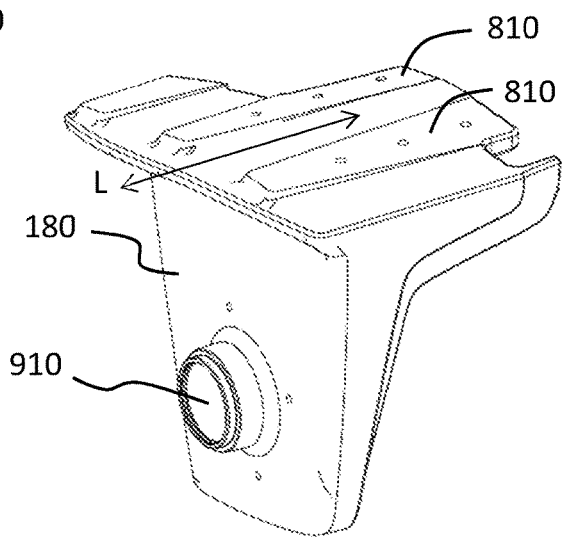
Figure 10:
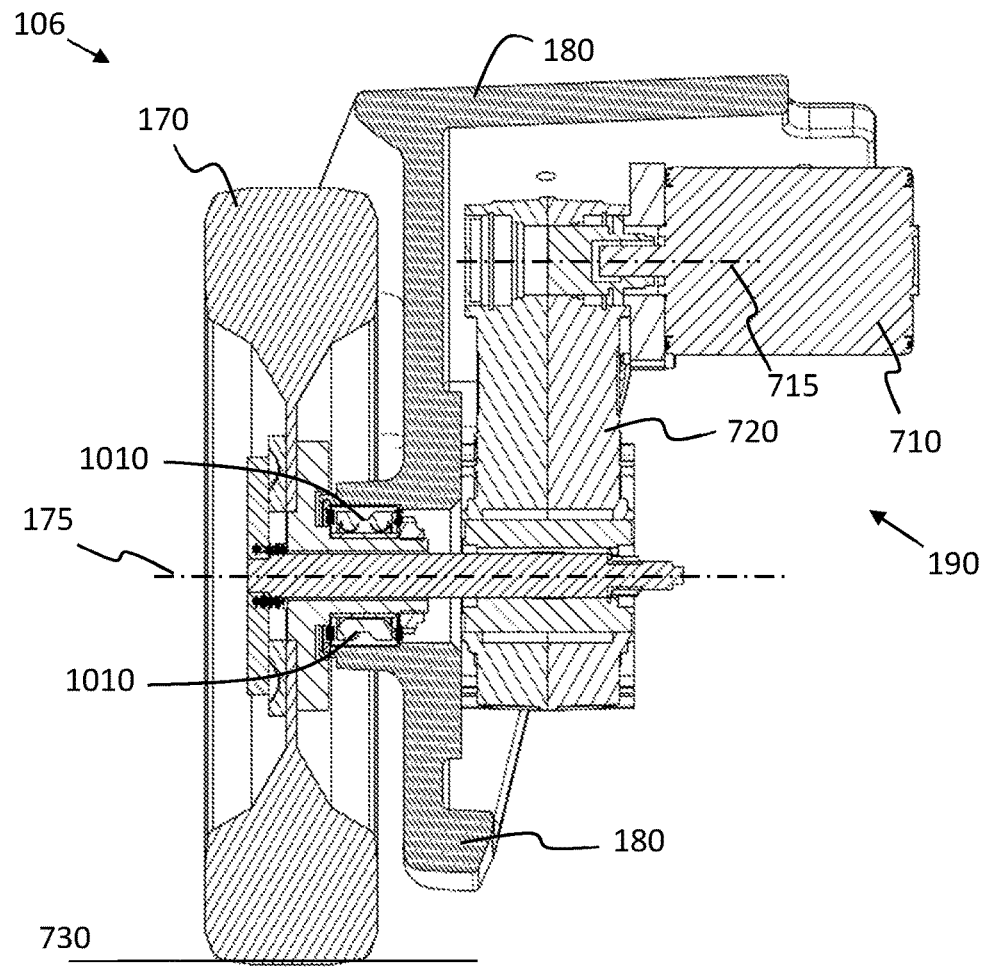

FIGS. 8 and 9 illustrate how a drive wheel 170 is attached to the support member 180. The integrally formed support member 180 comprises a seat 910 for receiving a wheel bearing 1010 (best seen in FIG. 10) of the attachable wheel 170. Since the wheel bears against the seat 910, the wheel axle is spared from supporting the full weight of the floor surfacing machine 100. With reference to FIG. 10, the force from the ground plane 730 is guided up through the wheel 170 and via the bearing 1010 into the support member 180. The wheel axle 175 is thus spared from supporting the full weight of the floor surfacing machine 100.

To accommodate different diameters of, e.g., the planetary head 140, the wheel support assembly 106 may according to some aspects be arranged displaceable 810 along a lateral displacement direction L, as shown in FIGS. 8 and 9, with respect to a longitudinal direction P of the attachable wheel 170. The support member 180 is arranged to be fixed 820 at two or more different lateral displacements. This is exemplified by bolt holes 820 in FIGS. 8 and 9, but may also be achieved using, e.g., a clamping arrangement or the like.

According to some aspects, the wheel support assembly 106 comprises an integrated drive arrangement 190 arranged to drive the attached wheel 170 by a drive unit 710 via a connecting member 720. With reference to FIG. 10, an axle 715 of the drive unit 710 is parallelly displaced from an axle 175 of the attachable wheel 170. This way the drive unit 710 can be moved away from the ground plane 730 to a place where it is somewhat sheltered compared to the case where the drive unit is arranged coaxially with the wheel axle.

The drive unit 710, may, e.g., be an electric motor connected to the wheel via a gear transmission or belt drive.

Figure 7:
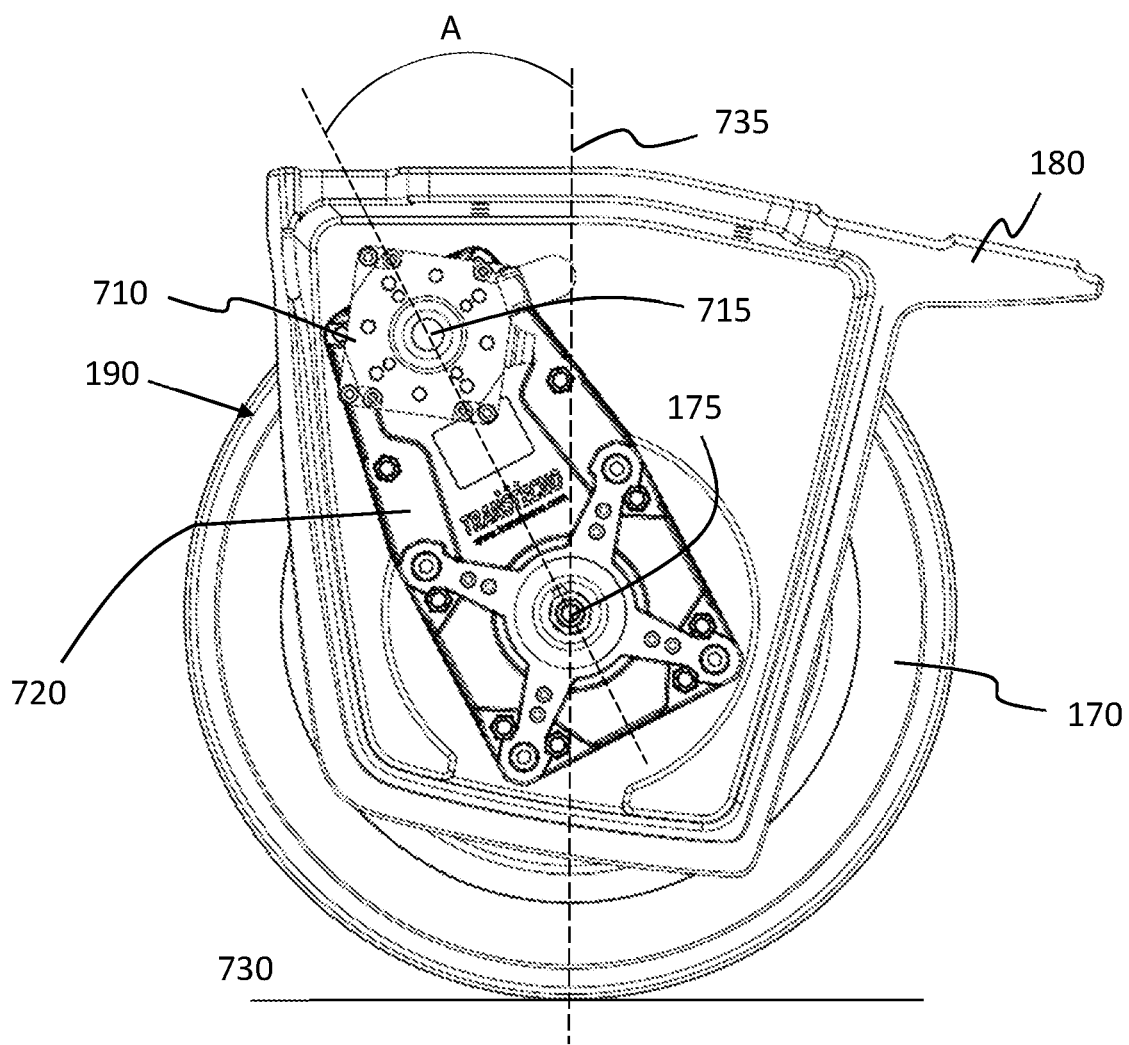
FIGS. 7-10 illustrate example wheel support assemblies.

To save space under the machine 100, and simplify access to, e.g., the outlet opening 160, with reference to FIG. 7, the drive unit 710 may be arranged at an angle A from an axle 175 of the attachable wheel 170 with respect to a ground plane 730 normal 735. This way, if the wheel support assembly 106 is a left wheel 171 support assembly, the angle A can be configured different compared to the angle A for a right wheel 172 support assembly. For instance, one drive wheel unit can be angled in the forward direction and one drive wheel unit can be angled in the opposite direction. This type of drive unit angle configuration is exemplified in FIG. 1D.

Aspects of the disclosure also relates to a system for motor overload warning. The floor surfacing machine 100 then comprises one or more sensors or systems for detecting an overload condition at least at the first drive motor 110 and/or at the second drive motor 130. The system may include a control unit for receiving information from said sensors, and based on said information determining whether the overload condition has been met. As an example, the overload condition may include that the amount of current consumed by a motor is higher than a threshold current value. In case overload is detected a warning signal may be triggered. The warning signal may appear either on a display as e.g. a pop up message or via signaling means such as warning lights in connection to the floor surfacing machine 100. The warning signal may also be generated or displayed on a remote control for remotely controlling the floor surfacing machine 100. The warning signal may include information regarding which of the motors for which the overload condition has been met. Preferably, the warning signal is indicative on which of the first—110 and the second motors 130 that has reached an overload condition.

According to aspects, a warning signal is generated initially when overload is detected. In case the overload condition persists despite having triggered the warning signal, then an emergency stop may be triggered, or an automatic reduction in applied grinding force in order to reduce load on the first and/or second drive motor.

The invention claimed is:

1. A drive arrangement for a floor surfacing machine, the drive arrangement comprising;
   a first drive wheel arranged to be driven by a first motor,
   a second drive wheel fixedly attached to a planetary head and arranged to be driven by the first drive wheel,
   a second drive motor arranged to drive at least one satellite grinding head, and
   a protective casing arranged to enclose the first and second drive wheels,
   wherein the second drive wheel is journaled about and coaxial with a motor axle of the second drive motor, and
   wherein the protective casing is stationary and does not rotate with the planetary head.

2. The drive arrangement according to claim 1, wherein the second drive wheel is arranged to be driven by the first drive wheel via a connecting member, and wherein the first and second drive wheels are sprockets configured to engage a drive chain constituting the connecting member.

3. The drive arrangement according to claim 2, wherein the drive chain is a double chain.

4. The drive arrangement according to claim 2, wherein the drive chain is a self-lubricating chain.

5. The drive arrangement according to claim 1, wherein the second drive wheel is arranged to be driven by the first drive wheel via a connecting member, and wherein the first and second drive wheels are belt pulleys configured to engage a drive belt constituting the connecting member.

6. The drive arrangement according to claim 1, wherein the second drive wheel is arranged to be driven by the first drive wheel via a connecting member, and wherein the connecting member comprises a gear train or gear transmission arranged to transfer power from the first motor to the second drive wheel.

7. The drive arrangement according to claim 1, wherein a diameter of the second drive wheel is larger than a diameter of the first drive wheel.

8. The drive arrangement according to claim 1, wherein the at least one satellite grinding head is fixedly attached to a belt pulley or gear, wherein the belt pulley or gear is arranged to be driven by a belt or other connecting member from a central pulley or gear attached to the motor axle of the second drive motor.

9. The drive arrangement according to claim 1, wherein the second drive wheel is arranged radially inwards from a motor axle of the first drive motor on the planetary head (140).

10. A floor surfacing machine comprising the drive arrangement according to claim 1.

11. The drive arrangement according to claim 1, further comprising a connecting member, wherein the second drive wheel is arranged to be driven by the first drive wheel via the connecting member.

12. The drive arrangement according to claim 1, further comprising a connecting member,
   wherein the protective casing is arranged to enclose the first and second drive wheels and the connecting member, wherein the protective casing protects the drive arrangement from dust, debris and slurry, and wherein the protective casing is a sealed casing.

13. The drive arrangement according to claim 12, wherein the protective casing is configured to hold an amount of lubricating agent.

14. The drive arrangement according to claim 12, wherein the protective casing comprises a sheet material enclosure arranged to be sealed against a rotating part of the floor surfacing machine by a radial seal arranged around the motor axle of the second drive motor.

15. The drive arrangement according to claim 14, wherein the sheet material enclosure is arranged to be sealed against a motor mounting plate to which the first motor is attached, and the protective casing is arranged to be attached to the motor mounting plate by at least one sealing screw.

16. The drive arrangement according to claim 15, further comprising a second seal between the protective casing and the motor mounting plate;

wherein the second seal comprises a foam seal arranged circumferentially along a rim of the protective casing.

17. A floor surfacing machine comprising a planetary head with one or more satellite grinding heads, wherein a first drive motor is arranged to drive the planetary head via a drive arrangement and wherein a second drive motor is arranged to drive the one or more satellite grinding heads, the drive arrangement comprising a second drive wheel fixedly attached to the planetary head and arranged to be driven by the first motor via a connecting member, wherein the second drive wheel is arranged radially inwards from a motor axle of the first drive motor on the planetary head, wherein the drive arrangement further comprises a protective casing arranged to enclose the first and second drive wheels, and wherein the protective casing is stationary and does not rotate with the planetary head.

18. A floor surfacing machine comprising a planetary head with one or more satellite heads, wherein a first drive motor is arranged to drive the planetary head via a drive arrangement and wherein a second drive motor is arranged to drive the one or more satellite heads, the drive arrangement comprising:

a first drive wheel arranged to be driven by the first drive motor, and a second drive wheel fixedly attached to the planetary head and arranged to be driven by the first drive wheel, wherein the second drive wheel is arranged radially inwards from a first motor axle of the first drive motor relative to a rotational axis of a second motor axle of the second drive motor, and wherein the second drive wheel is provided with a central aperture encircling the second motor axle, and the second drive wheel being arranged coaxial with the second motor axle and arranged rotatable relative to the second motor axle, wherein the drive arrangement further comprises a protective casing arranged to enclose the first and second drive wheels, and wherein the protective casing is stationary and does not rotate with the planetary head.

19. The floor surfacing machine according to claim 18, wherein the rotational axes for the first drive wheel and the second drive wheel are parallel and the first drive wheel and the second drive wheel are arranged in a common plane, said plane being arranged perpendicular to said rotational axes.

20. The floor surfacing machine according to claim 18, wherein the drive arrangement comprises a connecting member, such that the second drive wheel is driven by the first drive wheel via said connecting member.

21. The floor surfacing machine according to claim 18, wherein the drive arrangement is sealingly encapsulated and thereby separated from a drive arrangement for driving the one or more satellite heads.

\* \* \* \* \*